(No Model.) 2 Sheets—Sheet 1.
J. T. WHITTEN.
SPLINT MACHINE.

No. 572,232. Patented Dec. 1, 1896.

Witnesses.
Inventor
John T. Whitten
by D. C. Fitzgerald
Att'y (No Model.) 2 Sheets—Sheet 2.
J. T. WHITTEN.
SPLINT MACHINE.
No. 572,232. Patented Dec. 1, 1896.
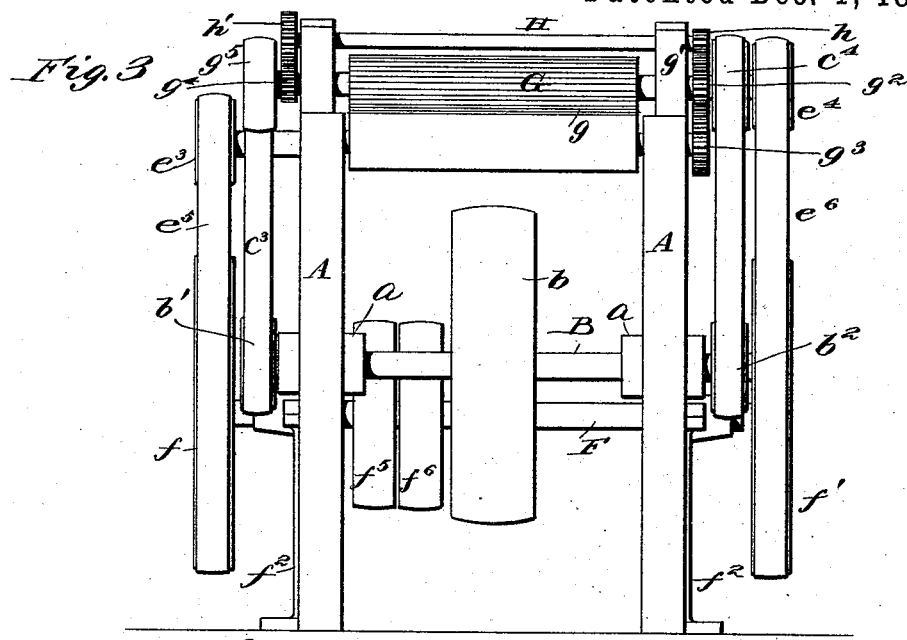
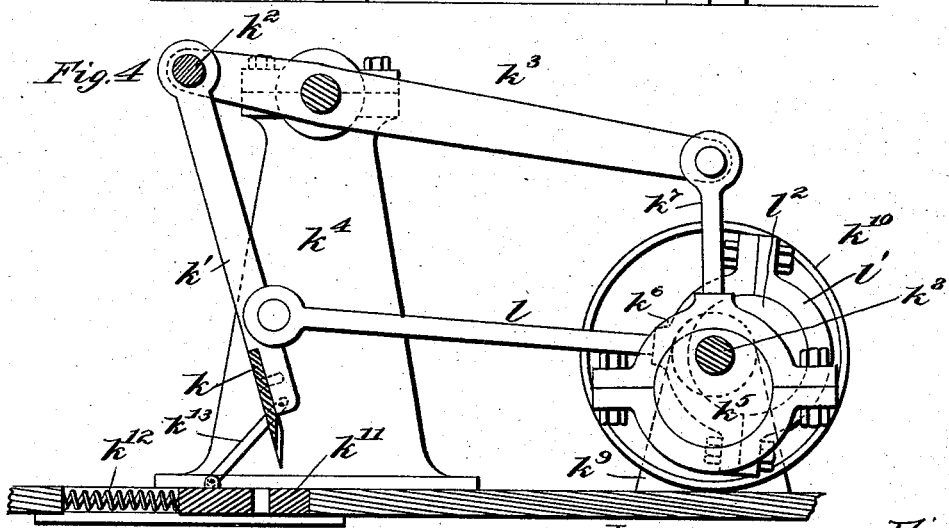
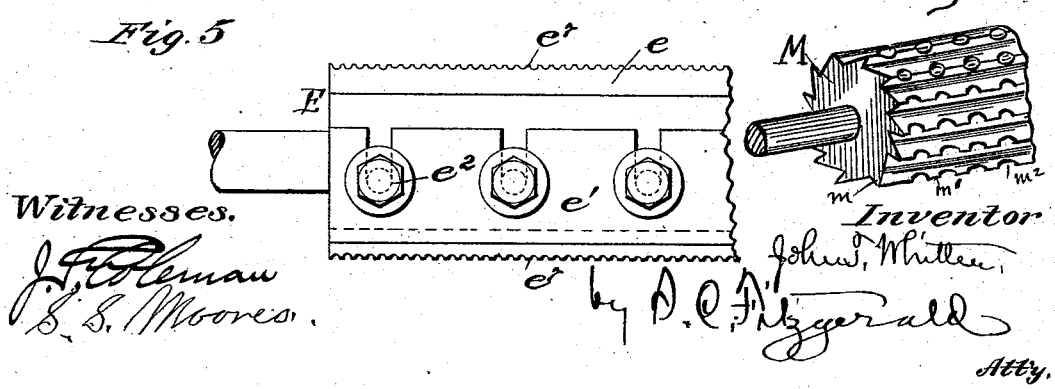
Witnesses.
Inventor
John T. Whitten
by D. C. Fitzgerald
Atty.

UNITED STATES PATENT OFFICE.

JOHN TODD WHITTEN, OF PASSAIC, NEW JERSEY.

SPLINT-MACHINE.

SPECIFICATION forming part of Letters Patent No. 572,232, dated December 1, 1896.

Application filed March 14, 1896. Serial No. 583,243. (No model.)

*To all whom it may concern:*

Be it known that I, JOHN TODD WHITTEN, a citizen of the United States, residing at Passaic, in the county of Passaic, State of New Jersey, have invented certain new and useful Improvements in Splint-Machines; and I do hereby declare the following to be a full, clear, and exact description of the invention, such as will enable others skilled in the art to which it appertains to make and use the same.

My invention relates to improvements in splint-making machines for producing splints for matches, toothpicks, and the like.

The invention will first be described in connection with the accompanying drawings, and then particularly pointed out in the claims.

Figure 1:
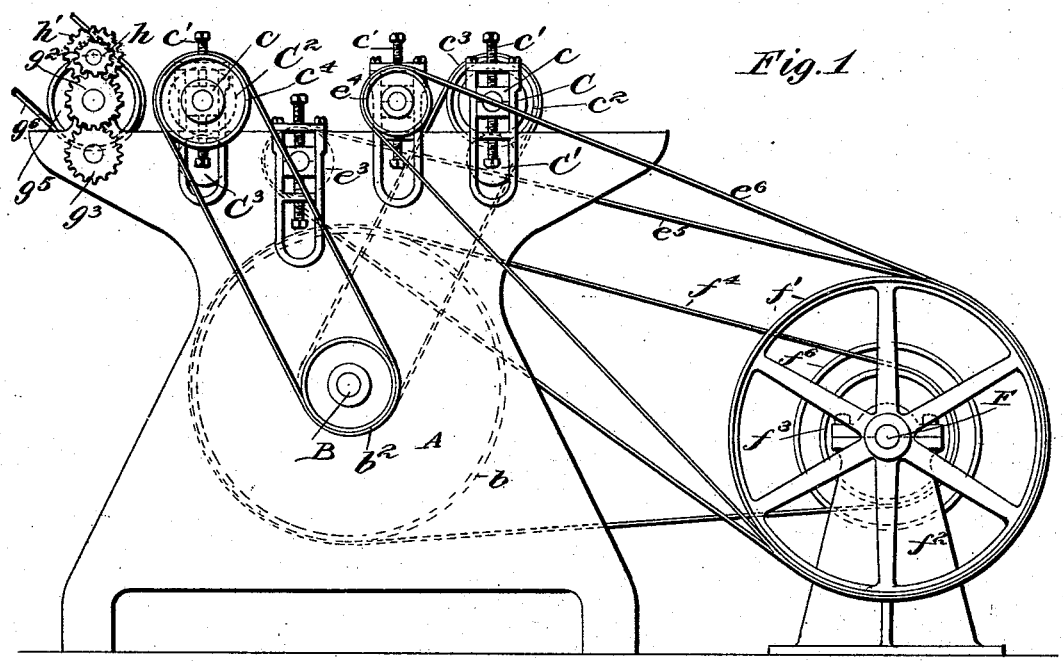
Figure 2:
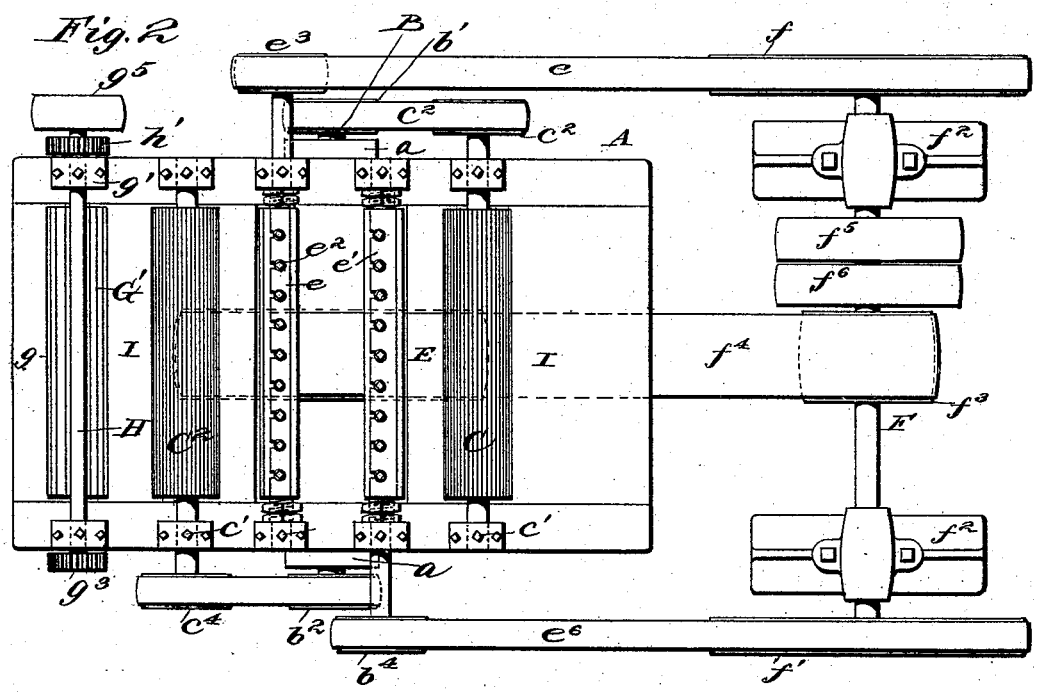

In the drawings, Figure 1 is a side elevation of my improved splint-machine. Figs. 2 and 3 are respectively a plan and rear view of the same. Fig. 4 is an enlarged detail view of a modified form of the cutting mechanism. Fig. 5 is an enlarged detail view of the knife-head, and Fig. 6 is a similar view of a modified form of same.

Referring to the drawings, A is a framework provided with journal-boxes $a$, in which is mounted a main shaft B, having a large pulley $b$ fixed to it between the framework, and a small pulley $b'$ $b^2$, one at each end, the shaft projecting beyond the framework at each end to receive the said pulleys $b'$ $b^2$. At the top of the framework are arranged two pair of feed-rollers, a front pair C C' and a rear pair $C^2$ $C^3$, the upper feed-roller of each pair being mounted in vertically-movable journal-boxes $c$ in the usual manner to permit the upper feed-rollers to be adjusted at any desired distance apart from their corresponding lower rollers. The adjustment of these journal-boxes is made by means of screws $c'$, as shown. The upper front feed-roller C has its shaft extended at one end beyond the framework of the machine and provided with a pulley $c^2$, which is driven by a chain or belt $c^3$ from the pulley $b'$ on the main shaft B. The upper rear feed-roller $C^2$ has its shaft also extended beyond the framework and is provided with a pulley $c^4$, but on the side opposite the pulley $c^2$, the said pulley $c^4$ being driven from the pulley $b^2$ on the shaft B.

In the upper part of the framework A are mounted two revoluble cutter or knife heads E, provided with knives $e$ $e'$, attached to the heads in any usual or desired manner, as by bolts $e^2$, the heads being rotated by means of pulleys $e^3$ $e^4$, secured to opposite ends of the respective cutter-head shafts and driven by belts $e^5$ $e^6$ from pulleys $f$ $f'$, fixed at the opposite ends of a counter-shaft F, which is journaled in standards $f^2$, and has a pulley $f^3$ connected to and driving the pulley $b$ on shaft B by a chain or belt $f^4$. The counter-shaft is provided also with the usual tight and loose pulleys $f^5$ $f^6$.

The cutter-heads referred to above are arranged one below and one above the path of travel of the material to be operated upon, and are provided with the usual means of adjustment in order that they may be moved closer to or farther from the surface to be cut.

The upper cutter-head has its axis provided at each end with threads inside the journal-boxes, and has nuts on the threaded portions, whereby the cutter-head may be adjusted longitudinally.

Each knife $e$ $e'$, instead of having a straight cutting edge, as shown in Fig. 4, may be varied the indentations being made semicircular, semihexagonal, semioctagonal, or otherwise, as may be necessary to give the desired shape to the splint, it being understood that between the spaces or indentations are teeth $e^7$, which cut through the material operated upon, one set of knives operating on the under side and the other set on the upper side to produce the splints.

For the purpose of cutting the splints into their proper lengths a cutting device is mounted in the framework A at the rear of the rear feed-rollers, this cutting device consisting of a lower feed-roller G and an upper cutting-roller G', which is provided with radially-projecting longitudinal knives $g$, the cutting-roller G' being mounted in vertically-adjustable bearings $g'$, whereby it may be adjusted so as to cut the splints properly. The feed-roller G and the cutting-roller G' are geared together by gears $g^2$ $g^3$, fixed on their axes at one end, and both are driven by a gear-wheel $h$, fixed on a transverse shaft H above the cutting-roller G', which is provided at its end opposite the gear-wheels $h$, $g^2$, and $g^3$ with a gear-wheel $h'$, meshing into a pinion $g^4$, formed integral with or fixed to a pulley $g^5$, the said pulley and pinion being loosely mounted on the axis of the cutting-roller G', which projects beyond the framework A for that purpose. The pulley $g^5$ is driven by a belt $g^6$ from any suitable point.

To support the material a bed I may be provided, being secured to the framework so as to be removable therefrom and having an opening $i$, through which the lower knives may work to operate upon the under surface of the material.

Instead of the cutting device G' described, I may employ a reciprocating knife mechanism, in which means are provided for moving the knife along as the material travels at the time of cutting the same into lengths. This mechanism consists of a knife $k$, fixed at each end to arms $k'$, which are pivoted to a shaft $k^2$, carried in levers $k^3$, journaled or fulcrumed in standards $k^4$, fixed to the machine-framework A. The levers $k^3$ are reciprocated by eccentrics $k^5$, straps $k^6$, and rods $k^7$, the latter being connected to the ends of their respective levers. The eccentrics are fixed in a shaft $k^8$, journaled in bearings $k^9$ on the machine-frame and driven by a pulley or gearwheel $k^{10}$ from any convenient moving portion of the mechanism or from the countershaft. The revolution of the shaft $k^8$ uses the knife $k$ to reciprocate toward and from the table and thereby cut the splints into lengths in an obvious manner; but as the splints are moving toward the rear of the machine continuously it becomes necessary to move the knife $k$ in the same direction and at the same rate of speed when descending through the material, in order that the latter will not be crowded against the knife $k$ and be broken. This I do by attaching an eccentric-rod $l$ to one or both arms $k'$, the said rod $l$ being reciprocated by an eccentric-strap $l'$ and eccentric $l^2$, the latter being fixed on the shaft $k^8$, above referred to. The speed at which said shaft $k^8$ is driven and the throw of the eccentrics are so proportioned that the knife will descend at the proper intervals to cut the splints into the desired lengths and the knife $k$ will travel rearward while descending at the same rate of speed as the material is moved by the feed-rollers C C' $C^2$ $C^3$.

The knife $k$ is preferably deeper at one end than at the other, in order to give a shear cut, and in this case the bed below the knife has an opening in which is placed a sliding plate $k^{11}$, normally pressed toward the front of the machine by a spring $k^{12}$. The said plate is provided with a slot into which the knife $k$ projects when down, and as the knife moves rearward with the material to be cut the plate is also moved rearward by fingers $k^{13}$, pivoted to the plate and to the arms $k'$, as shown.

Instead of the removable cutting-knives $e$ $e'$, I may, if desired, employ a solid head M, as shown in Fig. 6, the said head resembling a large ratchet-wheel in cross-section, the projecting portions $m$ being formed with teeth $m'$ and spaces $m^2$ in the same manner as the removable knives $e$ $e'$, previously described.

Having thus fully described my invention, what I claim, and desire to secure by Letters Patent, is—

1. In a splint-machine, the combination, with a knife, of a pair of arms carrying the knife, a pair of levers to which said arms are pivoted, said levers being fulcrumed on a fixed frame, an eccentric for oscillating said levers, and an eccentric for oscillating the arms, substantially as described.

2. In a splint-machine, the combination, with a knife, means for forcing the knife down, and mechanism for moving the knife rearward, of a bed having an opening, a plate movable in said opening and provided with a slot into which the knife can project, and connections between the knife-moving mechanism and the plate, whereby the slot is kept below the knife, substantially as described.

3. In a splint-machine, the combination, with a molding-machine consisting of a frame supporting a pair of front and a pair of rear feed-rollers, a bed having an opening between said front and rear feed-rollers, a pair of cutter-heads, arranged one above and one below said opening, knives secured to said cutter-heads, of a reciprocating knife, a pair of arms carrying the knife, a pair of levers to which the arms are pivoted, said levers being fulcrumed on a fixed frame, an eccentric for oscillating said levers, and an eccentric for oscillating the arms, substantially as and for the purpose specified.

In testimony whereof I affix my signature in presence of two witnesses.

JOHN TODD WHITTEN.

Witnesses:
JOHN H. ASHMORE,
ANTON EHMANN.